United States Patent
Sasse et al.

(10) Patent No.: US 7,073,646 B2
(45) Date of Patent: Jul. 11, 2006

(54) TORSIONAL VIBRATION DAMPER

(75) Inventors: Christoph Sasse, Schweinfurt (DE);
Jörg Sudau, Niederwerrn (DE); Ralf Rönnebeck, Schonungen (DE); Jürgen Ackermann, Schweinfurt (DE); Peter Frey, Gerolzhofen (DE); Erwin Wack, Niederwerrn (DE); Frank Zerner, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 63 days.

(21) Appl. No.: 10/817,121

(22) Filed: Apr. 2, 2004

(65) Prior Publication Data
US 2004/0226794 A1 Nov. 18, 2004

(30) Foreign Application Priority Data

| Apr. 5, 2003 | (DE) | ................................. 103 15 567 |
| Oct. 28, 2003 | (DE) | ................................. 103 50 297 |
| Dec. 16, 2003 | (DE) | ................................. 103 58 901 |

(51) Int. Cl.
*F16D 47/02* (2006.01)

(52) U.S. Cl. .................. 192/3.29; 192/213.1
(58) Field of Classification Search ............... 192/2.29, 192/213.1
See application file for complete search history.

(56) References Cited

U.S. PATENT DOCUMENTS

| 4,523,916 A | | 6/1985 | Kizler et al. |
| 4,987,980 A | * | 1/1991 | Fujimoto ................... 192/3.28 |
| 5,080,215 A | | 1/1992 | Förster et al. |
| 5,575,363 A | | 11/1996 | Dehrmann et al. |
| 5,713,442 A | * | 2/1998 | Murata et al. ............. 192/3.29 |
| 6,571,929 B1 | * | 6/2003 | Tomiyama et al. ...... 192/213.1 |

FOREIGN PATENT DOCUMENTS

| DE | 43 33 562 A1 | 4/1994 |
| DE | 195 14 411 | 11/1995 |
| DE | 199 20 542 A1 | 11/1999 |

\* cited by examiner

*Primary Examiner*—Saul Rodriguez
(74) *Attorney, Agent, or Firm*—Cohen, Pontani, Lieberman & Pavane

(57) ABSTRACT

A torsional vibration damper on the bridging clutch of a hydrodynamic clutch arrangement has a first connecting device, which can be brought into working connection with the clutch housing and with a drive-side transmission element. The drive-side transmission element is connected via first energy-storage devices to an intermediate transmission element. The torsional vibration damper also has a second connecting device for establishing a working connection via second energy-storage devices between the intermediate transmission element and a takeoff-side transmission element, which is connected to a takeoff-side component of the hydrodynamic clutch arrangement. The intermediate transmission element accepts a mass element, located operatively between the two connecting devices.

36 Claims, 10 Drawing Sheets

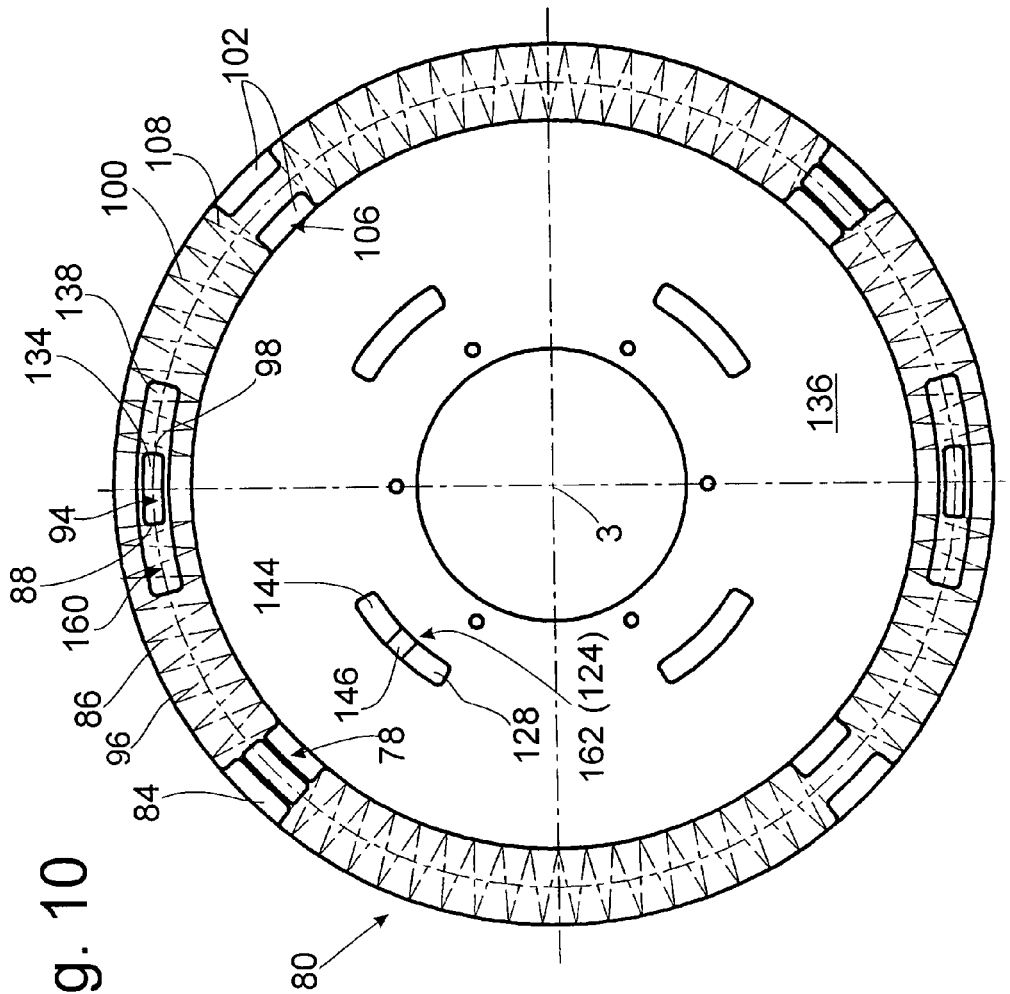

TORSIONAL VIBRATION DAMPER

BACKGROUND OF THE INVENTION

1. Field of the Invention

The invention pertains to a torsional vibration damper in the bridging clutch of a hydrodynamic clutch arrangement having an axis of rotation, a clutch housing, a turbine wheel, and a takeoff-side component, wherein the torsional vibration damper includes a drive-side connecting device comprising a drive-side transmission element which can be connected to the clutch housing; a takeoff-side connecting device comprising a take-off side transmission element which can be connected to the takeoff-side component; an intermediate transmission element between the connecting devices; first energy storage devices connecting the intermediate transmission element to the drive-side connecting device; and second energy storage devices connecting the intermediate transmission element to the takeoff-side connecting device.

2. Description of the Related Art

A torsional vibration damper of this type is known from, for example, U.S. Pat. No. 5,080,215, FIG. 3. The hydrodynamic clutch arrangement, realized as a torque converter, is designed with a bridging clutch, the piston of which is provided with a friction surface on the side facing the clutch housing. This friction surface of the piston can be brought into frictional contact with an opposing friction surface. The bridging clutch establishes a working connection between the clutch housing and the torsional vibration damper, in that a radially outer hub disk of the damper engages with the piston in such a way that it cannot rotate relative to the piston but can move in the axial direction. The radially outer hub disk acts as a drive-side transmission element of the torsional vibration damper and works together with first energy-storage devices and with cover plates, which serve as an intermediate transmission element of the torsional vibration damper, to form a drive-side connecting device. The cover plates, which are a certain axial distance apart, cooperate in turn with second energy-storage devices and with a radially inner hub disk, which is part of a takeoff-side transmission element, to form a takeoff-side connecting device. Like the radially outer hub disk, the radially inner hub disk is located here axially between the cover plates. Like the intermediate transmission element and the takeoff-side transmission element, the drive-side transmission element also has driver elements for the energy-storage devices.

The radially inner area of the hub disk of the takeoff-side transmission element is connected by a set of teeth to a retaining bracket so that it cannot rotate but can move in the axial direction, the bracket also being a part of the takeoff-side transmission element. This bracket is attached to a turbine wheel hub, which also permanently holds the base of the turbine wheel. The turbine wheel hub can be connected nonrotatably by a set of teeth to a takeoff-side component of the hydrodynamic clutch arrangement such as a gearbox input shaft.

When considered as a freely vibrating system with a hydrodynamic clutch arrangement, the power train of a motor vehicle can be reduced to roughly to six masses. The drive unit with a pump wheel is the first mass; the turbine wheel is the second mass; the gearbox input shaft is the third mass; the universal shaft and the differential represent the fourth mass; the wheels are the fifth mass; and the overall vehicle itself can be assumed to represent the sixth mass. In the case of a freely vibrating system with n masses, or 6 masses in the present case, it is known than n–1 resonant frequencies, thus five resonant frequencies in the present case, can be present. The first of these pertains to the rotation of the overall vibrating system and is therefore irrelevant with respect to the damping of vibrations. The rotational speeds at which the resonant frequencies are excited depend on the number of cylinders of the drive unit, which is in the form of an internal combustion engine. FIG. 3 of the present application shows a logarithmic amplitude-versus-frequency plot of the vibrations at the turbine wheel of a hydrodynamic clutch arrangement.

To help minimize fuel consumption, there is a trend toward closing the bridging clutch at very low rpm's in order to minimize the losses in the hydrodynamic circuit caused by slippage. For the bridging clutch, this means that it is closed at a frequency which, although it may be above the first and second resonant frequencies EF1 and EF2, is still below the third and fourth resonant frequencies EF3 and EF4. Whereas the first two resonant frequencies EF1 and EF2 in the hydrodynamic circuit of the hydrodynamic clutch arrangement can be damped, the power train can be excited to cause undesirable noise as it passes through the third and fourth resonant frequencies EF3 and EF4. The third resonant frequency EF3 in particular can still have very high amplitudes.

To return to U.S. Pat. No. 5,080,215, the torsional vibration damper according to FIG. 3 has connecting devices arranged in series; the device on the drive side is provided on a component of the bridging clutch, the component in the present case being the piston, and the device on the takeoff side is supported on a takeoff-side component of the hydrodynamic clutch arrangement such as a gearbox input shaft. Despite the presence of two connecting devices, the torsional vibration damper is comparable in operative terms to a torsional vibration damper which has only a single connecting device between its drive part and its takeoff part, whereas, at the same time, because the takeoff-side transmission element of this torsional vibration damper is connected nonrotatably to the turbine wheel, it acts as a "standard damper" as it is frequently called in professional circles.

A standard damper offers the possibility of damping the amplitudes of the third and fourth resonant frequencies EF3 and EF4 equally, both of which are perceived to be unpleasant, but it is unable to reduce the third resonant frequency EF3 to such an extent that it no longer generates an unpleasant effect.

DE 195 14 411 A1 describes a bridging clutch in which the drive-side transmission element of a torsional vibration damper is in working connection with a turbine wheel hub of a hydrodynamic clutch arrangement, whereas the takeoff-side transmission element of the damper is in working connection with a takeoff-side component of the clutch arrangement, usually configured as the gearbox input shaft. These types of torsional vibration dampers, in which the takeoff-side transmission element and the turbine wheel have the freedom to rotate relative to each other, are called "turbine dampers" in the trade and have the following property:

As a result of the direct connection of the takeoff-side transmission element of the torsional vibration damper to the gearbox input shaft, the connecting device, which is also provided with energy-storage devices and the drive-side transmission element, acts as a component connected in series with the torsionally elastic gearbox input shaft. Because the connecting device is not nearly as stiff as the gearbox input shaft, however, the overall stiffness is such that the gearbox input shaft must be considered very "soft". This results in a very effective isolation of vibrations.

With respect to the resonant frequencies in the power train, the greater "softness" of the gearbox input shaft has the result that the third and fourth resonant frequencies EF3 and EF4 have greater amplitudes than those observed with a standard damper, but also that the third resonant frequency EF3 appears at much lower rpm's, namely, at rpm's on the order of the second resonant frequency EF2. The third resonant frequency EF3 therefore has virtually no effect in practice. No influence, however, can be exerted on the fourth resonant frequency EF4, which means that noise can occur when the rpm range associated with it is reached.

SUMMARY OF THE INVENTION

The invention is based on the task of designing a torsional vibration damper in a bridging clutch of a hydrodynamic clutch arrangement in such a way that the undesirable noises are no longer perceptible.

This task is accomplished by a mass element on an actuation point located operatively effectively between the two connecting devices.

By the addition of a mass element at an actuation point located operatively between two connecting devices of a torsional vibration damper, the damper's working characteristics can be fundamentally changed regardless of how it is installed in a hydrodynamic clutch arrangement such as a hydrodynamic torque converter or hydroclutch. With respect to the way in which the torsional vibration damper is installed, a basic distinction is made between a "standard damper" and a "turbine damper".

It should be pointed out again that a "turbine damper" is identified by the ability of its takeoff-side transmission element to rotate relative to the turbine wheel, which helps to form part of the hydrodynamic circuit. A design is preferred here in which the takeoff-side transmission element of the torsional vibration damper is attached to the hub of the turbine wheel, whereas the turbine wheel itself has a base, which is formed on the turbine wheel shell and which allows the wheel to rotate relative to the turbine wheel hub.

Conversely, in the case of the "standard damper", the takeoff-side transmission element of the torsional vibration damper is not free to rotate relative to the turbine wheel base, and in a preferred design, both of these components are attached to the turbine wheel hub.

As a result of the inventive addition of a mass element operatively between the two connecting devices of the torsional vibration damper, the drive-side connecting device of the damper acts as a standard damper, because a component of the bridging clutch puts it in working connection with the drive-side transmission element, and the intermediate transmission element, which acts as the takeoff-side component for this connecting device, is connected to the mass element. In this case the mass element is formed by the turbine wheel, possibly supplemented by additional mass on the turbine wheel. In the logarithmic amplitude-versus-frequency graph of the vibrations of the turbine wheel in a hydrodynamic clutch arrangement shown in FIG. 3, a standard damper of this type, as previously explained, has the effect of lowering the amplitude of both the third resonant frequency EF3 and the fourth resonant frequency EF4.

If the takeoff-side transmission element of the takeoff-side connecting device of this torsional vibration damper is able to rotate relative to the turbine wheel, because, for example, the base of its turbine wheel is mounted rotatably on the turbine wheel hub, which rigidly holds the takeoff-side transmission element of the torsional vibration damper, then the takeoff-side connecting device acts as a turbine wheel damper, which, after the resonant frequencies EF3 and EF4 have already been reduced by the drive-side connecting device installed as a standard damper, shifts the troublesome resonant frequency EF3 to lower rpm's at which this frequency is no longer troublesome. As a result of the measure of connecting the turbine wheel and possibly at least one supplemental mass to an intermediate transmission element of the torsional vibration damper at an actuation point located operatively between the two connecting devices of the torsional vibration damper, and also as a result of the measure of installing the turbine wheel on the takeoff side rotatably with respect to a takeoff-side transmission element of the torsional vibration damper, a torsional vibration damper is obtained in which the functional advantages of both a standard damper and a turbine damper are combined into a single unit and supplement each other in sequence. Thus, of the resonant frequencies EF3 and EF4 to be filtered out, only the less-troublesome resonant frequency EF4 finally arrives at a takeoff-side component of the hydrodynamic clutch arrangement, such as a gearbox input shaft, and, even so, its amplitude is reduced.

If, however, according to another preferred embodiment, the mass element acting on the intermediate transmission element at an actuation point between the between the two connecting devices is able to move relative to the turbine wheel, whereas the turbine wheel, in common with the takeoff-side transmission element of the torsional vibration damper, is connected nonrotatably to a takeoff-side component of the hydrodynamic clutch arrangement, then, although each of the connecting devices acts independently as a standard damper, each device nevertheless brings about, as a result of the cooperation of each with an independent mass, an independent damping of the resonant frequencies EF3 and EF4, so that these two resonant frequencies are reduced by the drive-side connecting device by a first value and then by the takeoff-side connecting device by a second value. Test bench measurements have shown that, as a result of the connection of the mass element to the intermediate transmission element, the takeoff-side connecting device can reduce the resonant frequencies EF3 and EF4 essentially to the same extent that the drive-side connecting device does. Thus, although, in this design of the torsional vibration damper, both resonant frequencies EF3 and EF4 are still present in their normal rpm ranges, they have been very significantly reduced and are thus no longer felt to be troublesome. A significant reduction of this type in these resonant frequencies would be impossible without the mass element acting between the two connecting devices, because the intermediate transmission element, which would otherwise be the only component on the torsional vibration damper, must be considered to have practically no mass at all.

So that the mass element in both of the previously described designs of the torsional vibration damper can function as effectively as possible, each of the supplemental masses is located as far out as possible in the radial direction. Thus, in cases where the turbine wheel acts on the intermediate transmission element, the supplemental mass will preferably be in the radially outer area of the turbine wheel, whereas, when the mass element is able to rotate relative to the turbine wheel, this mass element will be formed essentially by a supplemental mass attached to the intermediate transmission element by an essentially radially outward-extending tie element designed as a bracket. Of course, this tie element can also be provided with elasticity in the axial direction, which can be advantageous when wobbling movements are introduced into the torsional vibration damper.

By designing the radially inner end of the turbine wheel shell of the turbine wheel of the clutch arrangement, referred to below in brief as the "turbine wheel base", as a second cover plate connected nonrotatably to the first cover plate, which acts as the intermediate transmission element, it is possible to reduce both the number of separate components and the space which they occupy. The same advantage is offered by the measure of attaching both the drive-side transmission element of the torsional vibration damper and also at least one component of a rotational angle limiter to a common driver plate, which is attached preferably to a piston of the bridging clutch of the clutch arrangement and which will thus be able to follow along with the movement of the piston in the circumferential direction. The number of components can be reduced even more by designing the piston itself as the drive-side transmission element of the torsional vibration damper.

If the intermediate transmission element is attached directly to the turbine wheel shell by a weld, for example, it is possible to achieve an even further reduction in the number of components and a further decrease in the amount of the space they occupy. It is also advantageous to give any pins which may be present as fasteners for connecting the turbine wheel to the intermediate transmission element, the additional function of limiting the rotational angle. Additional associated advantages can be obtained when the mass element in the form of the turbine wheel is supplemented by an additional mass, obtained by bending over the radially outer area of the turbine wheel shell.

Advantageous elaborations of the torsional vibration damper by which it can be made more compact are described in the subclaims.

The functionality of the torsional vibration damper is not dependent on a series of connecting devices arranged radially one outside the other; on the contrary, it is possible to achieve the same functionality with connecting devices which are all essentially the same radial distance away from the axis of rotation of the hydrodynamic clutch arrangement but which are offset from each other in the circumferential direction. When both connecting devices are at the same radial height and in the radially outer area of the clutch arrangement, a considerable volume can be provided for the energy-storage devices of the two connecting devices, so that, even though the two connecting devices are compressed onto only one pitch circle diameter, a sufficiently soft overall elasticity can still be achieved, which makes it possible to lower the resonant frequency of the system to an uncritical frequency range. In addition, the arrangement of both connecting devices on the same pitch circle diameter reduces the number of components. If there were two pitch circle diameters, the number of components would have to be larger, such additional components consisting of, for example, energy-storage devices and the cover plates to accept and to actuate the additional energy-storage devices. As a result, the weight and the mass moment of inertia of a torsional vibration damper with both connecting devices on one pitch circle diameter are both reduced in comparison with torsional vibration dampers in which the connecting devices are arranged with an offset in the radial direction, and the amount of space occupied is also decreased, especially when the pitch circle diameter on which both connecting devices are located is in a radially outer area where the turbine wheel takes up less axial space than it does radially farther inward. This method of installing the connecting devices in a motor vehicle is to be preferred when the power train of the vehicle produces a relatively low level of vibrations and it is therefore more important to reduce the weight and the construction space than to obtain a very high mass moment of inertia.

Another advantage of this design of the torsional vibration damper is associated with the way in which the turbine wheel, serving as a mass element, is connected. Because the turbine wheel acts directly between the energy-storage devices of the two connecting devices by way of a cover plate provided with driver projections, it can thus be supported in a "floating" manner between the connecting devices without the need for any intermediate components.

The hydrodynamic clutch arrangement with the torsional vibration damper according to the invention can have only a single friction surface between the housing cover of the clutch housing and the piston of the bridging clutch, but, to increase the amount of torque which can be transmitted by the bridging clutch, the number of friction surfaces can be increased by providing at least one plate axially between the housing cover and the piston. If two or more plates are introduced into the bridging clutch, it is advantageous to interleave intermediate plates, which are connected nonrotatably to the housing cover, between the first plates. When the bridging clutch is designed with, for example, two plates and one intermediate plate, a total of four friction surfaces is obtained, which gives this bridging clutch the ability to transmit very high torques. It doesn't matter whether the plates are designed with friction linings on both sides and the intermediate plate carries no linings or whether the plates are designed without friction linings on the sides facing the intermediate plate and the intermediate plate carries friction linings on both sides.

It is preferable for the individual plate to be connected nonrotatably by means of a set of teeth to a retaining bracket, which in turn is connected nonrotatably to a drive-side transmission element, which conducts the torque to the torsional vibration damper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 10 is similar to FIG. 8 but shows a different combination of connecting devices;

FIG. 11 is similar to FIG. 9 but shows a different system for connecting the connecting devices to each other.

DETAILED DESCRIPTION OF THE PRESENTLY PREFERRED EMBODIMENTS

Figure 1:
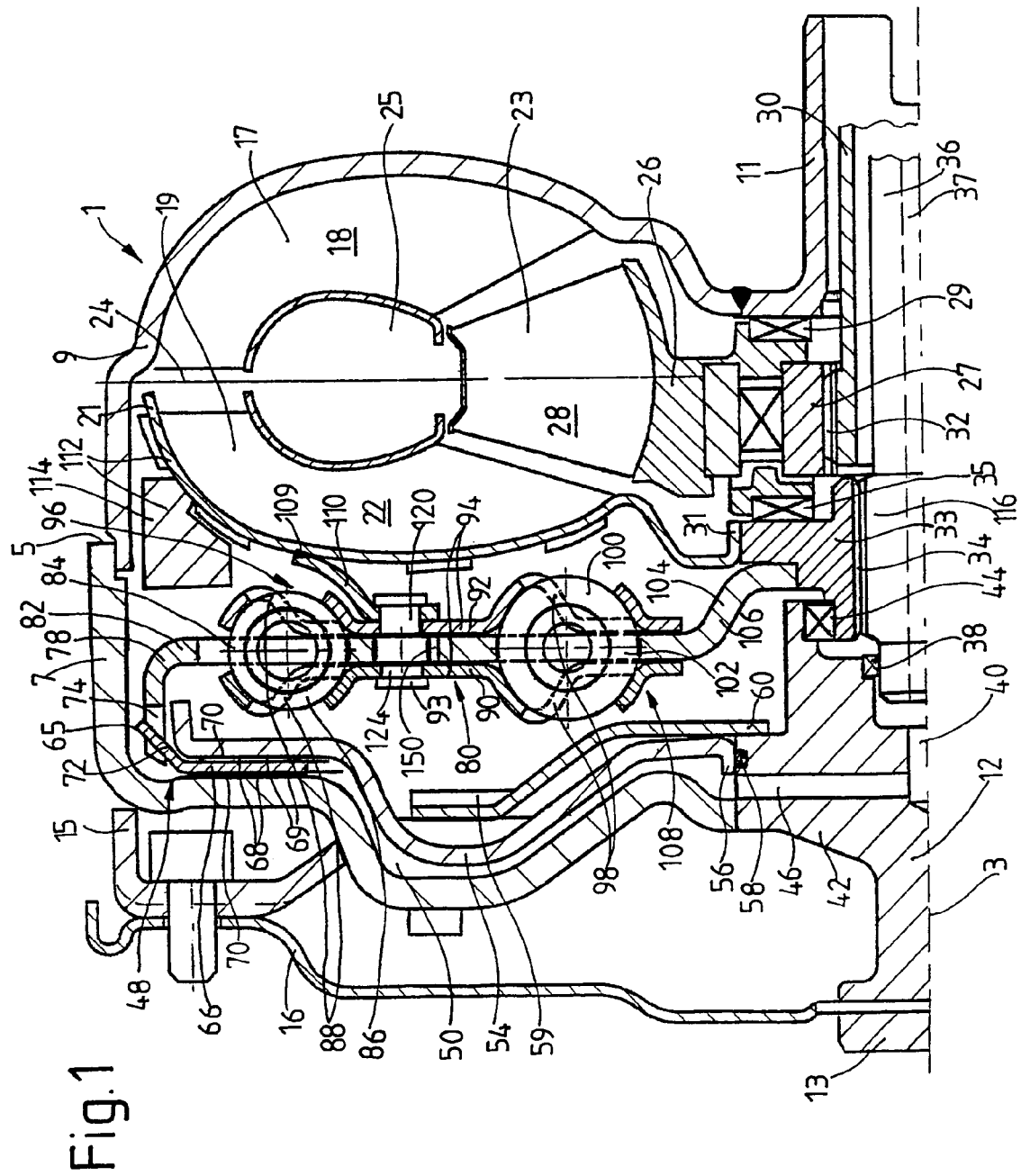
FIG. 1 shows the upper half of a longitudinal cross section through a hydrodynamic clutch arrangement with a bridging clutch and a torsional vibration damper, in which a turbine wheel, serving as a mass element, acts effectively between two connecting devices arranged with a radial offset from each other.

FIG. 1 shows a hydrodynamic clutch arrangement 1 in the form of a hydrodynamic torque converter, which is able to rotate around an axis of rotation 3. The hydrodynamic clutch arrangement 1 has a clutch housing 5, which has a housing cover 7 on the side facing a drive unit (not shown), such as an internal combustion engine. The housing cover is permanently connected to a pump wheel shell 9. The radially inner area of the shell merges into a pump wheel hub 11.

To return to the housing cover 7, this cover has, in its radially inner area, a journal hub 12 carrying a bearing journal 13. The bearing journal 13 is mounted in a manner known in itself and therefore not presented in detail on an element of the drive unit, such as a crankshaft, to center the clutch housing 5 on the drive side. The housing cover 7 also has a fastening bracket 15, which is used to attach the clutch housing 5 to the drive, preferably by way of a flexplate 16. FIG. 1 of U.S. Pat. No. 4,523,916, which is incorporated herein by reference, shows how the bearing journal of a hydrodynamic clutch arrangement can be mounted in the crankshaft of the drive unit and of how the hydrodynamic clutch arrangement can be connected to the crankshaft by means of a flexplate.

The previously mentioned pump wheel shell 9 and the pump wheel vanes 18 together form a pump wheel 17, which cooperates with a turbine wheel 19, which has a turbine wheel shell 21 and turbine wheel vanes 22. The pump wheel also cooperates with a stator 23, which has stator vanes 28. The pump wheel 17, the turbine wheel 19, and the stator 23 form a hydrodynamic circuit 24 in the known manner, which encloses an internal torus 25.

The stator vanes 28 of the stator 23 are provided on a stator hub 26, which is mounted on a freewheel 27. The latter is supported axially against the pump wheel hub 11 by an axial bearing 29 and is connected nonrotatably but with freedom of axial movement by a set of teeth 32 to a support shaft 30, which is radially inside the pump wheel hub 11. The support shaft 30, designed as a hollow shaft, encloses a gearbox input shaft 36, serving as the takeoff-side component 116 of the hydrodynamic clutch device 1, which shaft is provided with a central bore 37 to allow the passage of hydraulic fluid. The gearbox input shaft 36 has a set of teeth 34 by which it accepts a turbine wheel hub 33 nonrotatably but with freedom of axial movement; the radially outer area of this turbine wheel hub 33 serves to accept a turbine wheel base 31 in such a way that relative rotation is possible. The turbine wheel hub 33 is supported on one side against the previously mentioned freewheel 27 by an axial bearing 35 and rests on the other side against the journal hub 12 by way of an axial bearing 44. The journal hub 12 is sealed off radially on the inside against the gearbox input shaft 36 by a seal 38.

The previously mentioned central bore 37 in the gearbox input shaft 36 supplies the hydrodynamic circuit 24 with fluid, which exerts pressure on a bridging clutch 48, to be explained in greater detail below, for which purpose connections to a control device and a hydraulic fluid reservoir are required. Neither the control device nor the hydraulic fluid reservoir is shown in the drawings, but both can be seen in FIG. 1 of U.S. Pat. No. 5,575,363, which is incorporated herein by reference.

The hydraulic fluid which has entered through the central bore 37 in the gearbox input shaft 36 arrives first in a transition space 40, and from there it passes through channels 46 in the journal hub 12 serving as a flow passage 42, proceeding in the radially outward direction, and thus arrives in a chamber 50, which is located axially between the housing cover 7 and the piston 54 of the previously mentioned bridging clutch 48. This piston 54 is centered on the housing cover 7, and the side of the piston which faces away from the chamber 50 faces the hydrodynamic circuit 24. As a function of the pressure relationships in the hydrodynamic circuit 24 and in the chamber 50, the piston can move the bridging clutch 48 between two different limit positions and thus engage and disengage it. The base 56 of the piston 54 is supported on the journal hub 12 in such a way that it can move in the axial direction, and a piston seal 58, recessed into the journal hub 12, serves a sealing function with respect to the piston base 56. The piston 54 is connected by tangential leaf springs 59 to a mounting device 60, which is attached to the journal hub 12. The tangential leaf springs 59 hold the piston 54 under pretension relative to a plate 65, which will be described below.

The plate 65 is located axially between the converter cover 7 and the piston 54, in the radially outer area of the latter, and has a friction lining carrier 66. A friction lining 68 is provided on each side of this carrier. Each friction lining 68 provides a friction area 69, and these friction areas cooperate with opposing friction areas 70, one on the housing cover 7, the other on the piston 54. The outer circumferential area of the friction lining carrier 66 is provided with teeth 72, which extend all the way around the circumference. These teeth engage with opposing teeth 74 on the drive-side transmission element 78 of the torsional vibration damper 80. The teeth 72 and the opposing teeth 74 connect the plate 65 and thus the friction lining carrier 66 nonrotatably but with freedom of relative axial movement to the drive-side transmission element 78 of the torsional vibration damper 80.

The drive-side transmission element 78 has an area which extends essentially in the radial direction and which acts as the radially outer hub disk 82. This outer disk has radially inward-projecting driver elements 84, which can be brought into contact with first energy-storage devices 86. The energy-storage devices 86 extend essentially in the circumferential direction and are supported between the driver elements 84 and radially outward-projecting driver elements 88 of cover plates 90, 92, which, for example, are attached nonrotatably to each other by pins 93 and act together as the intermediate transmission element 94 of the torsional vibration damper 80. The pins 93 have the additional function of serving as part of a rotational angle limiter 124 between the cover plates 90, 92 and the hub disk 82, for which purpose the latter is provided with openings 150, which are in the form of slots extending in the circumferential direction and which thus give the pins 93 a certain freedom of relative movement in this direction.

In the radially inner area, the cover plates 90, 92 have essentially radially inward-projecting driver elements 98 for second energy-storage devices 100, which also extend essentially in the circumferential direction and which, at the other end, are supported against the essentially radially outward-projecting driver elements 102 of a radially inner hub disk 104. The hub disk 104 serves as a takeoff-side transmission element 106; it is attached by welding, for example, to the turbine wheel hub 33.

It should also be noted that the drive-side transmission element 78, the first energy-storage devices 86, and the intermediate transmission element 94 together form the drive-side connecting device 96 of the torsional vibration damper 80, whereas the intermediate transmission element 94, the second energy-storage devices 100, and the takeoff-side transmission element 106 together form a takeoff-side connecting device 108.

At an actuation point 120 in the radial part of the intermediate transmission element 94, radially between the two connecting devices 96 and 108, the pins 93 serve the additional function of attaching a tie element 110 to the turbine wheel-side cover plate 92. The other end of the tie element 110 is fastened to the turbine wheel 19, preferably by means of welds 109 on the turbine wheel shell 21. In this way, the turbine wheel 19 forms at least part of a mass element 112, which is connected operatively to the intermediate transmission element 94 between the two connecting devices 96 and 108. This mass element 112 can also have a supplemental mass 114 belonging to the turbine wheel 19, the supplemental mass being attached preferably to the turbine wheel shell 21 by welding, for example. This supplemental mass 114 is preferably located in the radially outer area of the turbine wheel 19 to increase its mass moment of inertia as much as possible.

Because the intermediate transmission element 94 acts as a takeoff component for the drive-side connecting device 96, and because this takeoff is permanently connected to the turbine wheel 19 by the tie element 110, the drive-side connecting device 96 functions as a standard damper. In contrast, the intermediate transmission element 94 serves as a drive-side component for the takeoff-side connecting device 108, whereas the takeoff-side transmission element 106 of this connecting device 108—although connected nonrotatably to the turbine wheel hub 33—is able to rotate relative to the turbine wheel 19. To this extent, the takeoff-side connecting device 108 acts as a turbine damper, for which the precondition is the ability of its takeoff-side component to rotate with respect to the turbine wheel.

Seen overall, FIG. 1 thus shows a torsional vibration damper 80 in which a standard damper and a turbine damper form a single structural unit in which they are connected to each other in series and can therefore supplement each other's specific functions.

Figure 2:
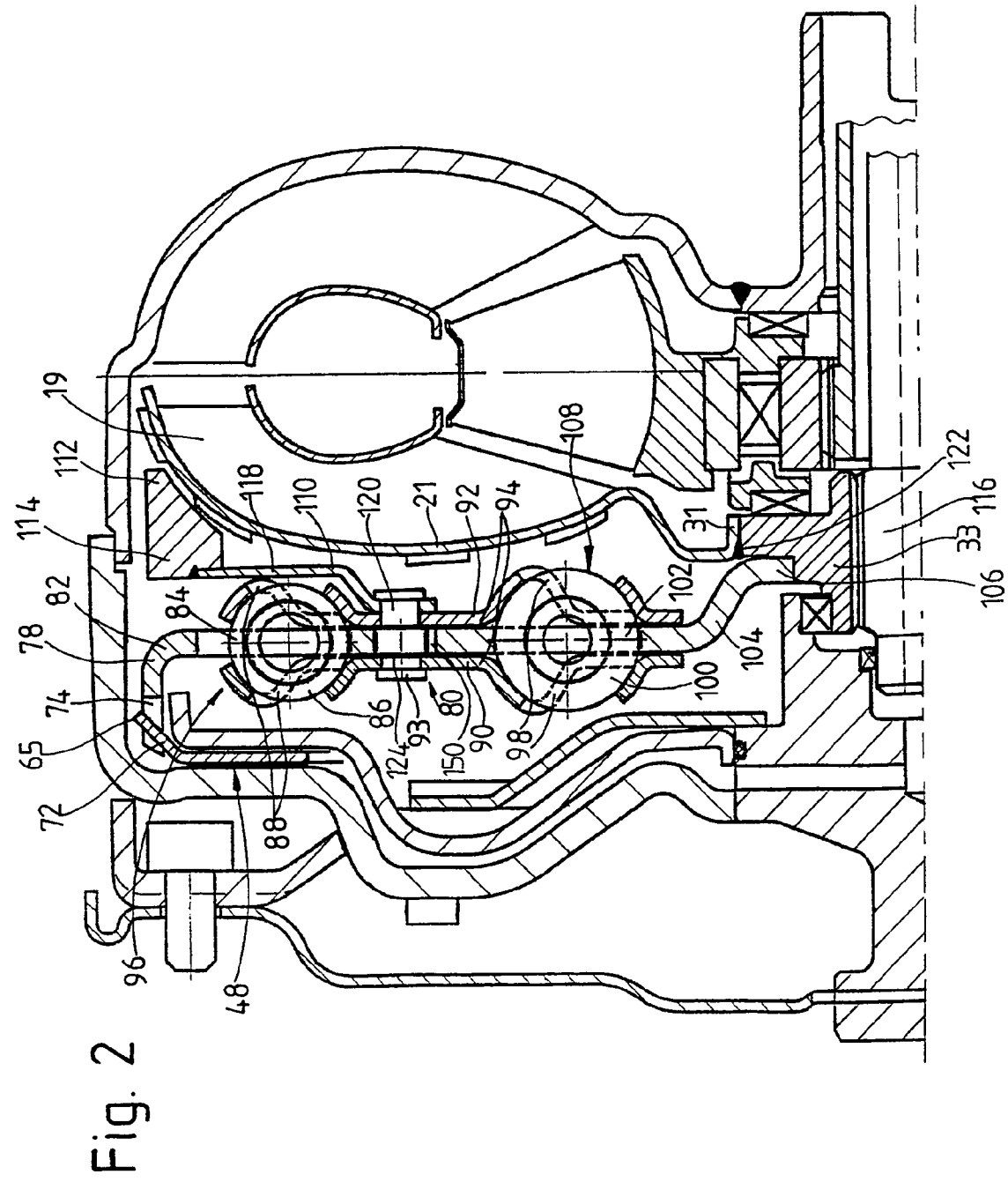
FIG. 2 is similar to FIG. 1 but shows a torsional vibration damper in which a supplemental mass acts as a mass element.
Figure 3:
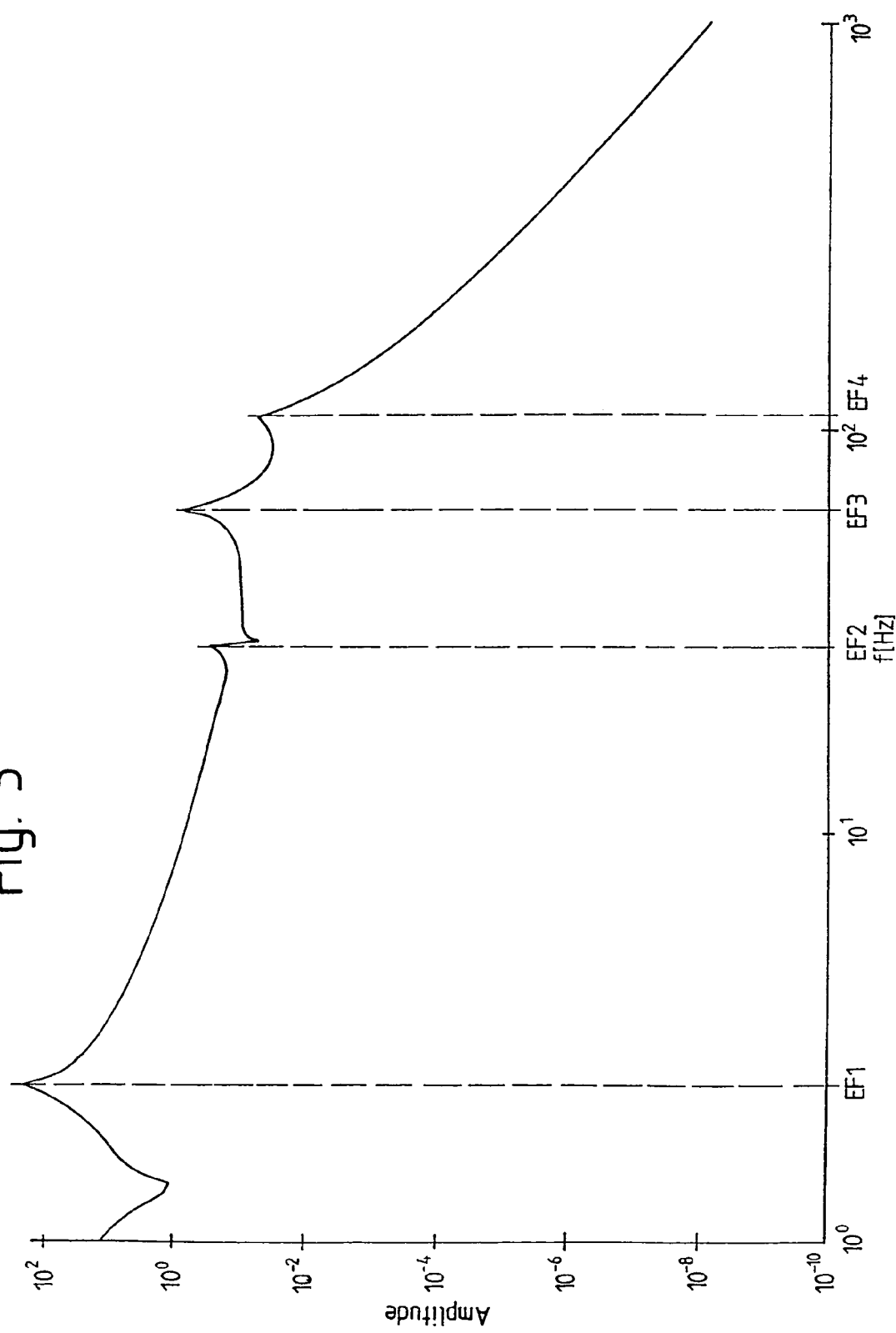
FIG. 3 is a logarithmic amplitude-versus-frequency plot the turbine wheel of the hydrodynamic clutch arrangement.

The torsional vibration damper 80 according to FIG. 2 is same as that according to FIG. 1 with respect to the design of its drive-side connecting device 96, which means that here, too, the drive-side connecting device 96 is acting as a standard damper. In contrast to FIG. 1, however, a tie element 110 in the form of a carrier 118 for the supplemental mass 114 is attached by pins 93 to the turbine wheel-side cover plate 92 and thus to the actuation point 120 of the intermediate transmission element 94 in such a way that the supplemental mass can shift in the circumferential direction relative to the turbine wheel 19. Starting from its actuation point 120 on the pins 93, the carrier 118 extends essentially in the radially outward direction for a relatively long distance, so that the supplemental mass 114 can occupy a position in the radially outer area of the turbine wheel 19. Thus the mass element 112 consisting of the supplemental mass 114 and the carrier 118 exerts a strong inertial effect, which acts on the intermediate transmission element 94 of the torsional vibration damper 80.

The intermediate transmission element 94 in conjunction with the mass element 112 serves as a drive-side component for the takeoff-side connecting device 108, whereas the takeoff side transmission element 106 and the turbine wheel base 31 are attached to the turbine wheel hub 33, preferably by a weld 122, as a result of which the takeoff-side connecting device 108 also acts as a standard damper. The torsional vibration damper 80 thus consists in this design of two standard dampers connected operatively in series with each other, it being the action of the mass element 112 between two connecting devices 96, 108 which is responsible for the extremely effective damping effect of the two independently acting connecting devices. Without the tie element between connecting the mass element 112 to the intermediate transmission element 94, the latter would have to be considered as virtually without mass, and the effect described in accordance with the invention would not occur.

The previously mentioned carrier 118 for the supplemental mass 114 is preferably designed with elasticity in the axial direction, so that the supplemental mass 114 can yield in the axial direction when wobbling movements are introduced into the torsional vibration damper 80.

Additional designs are shown in the following figures. In these designs as well as in the previously discussed design according to FIG. 1, the turbine wheel 19 is used in each case as the mass element 112, but, in contrast to FIG. 1, a hydrodynamic clutch arrangement is presented in which no plate 65 is inserted axially between the piston 54 of the bridging clutch 48 and the housing cover 7. Instead, a single friction lining 68 is attached to the side of the piston 54 facing the housing cover 7, so that the piston 54 itself now serves as the friction lining carrier 66.

Figure 4:
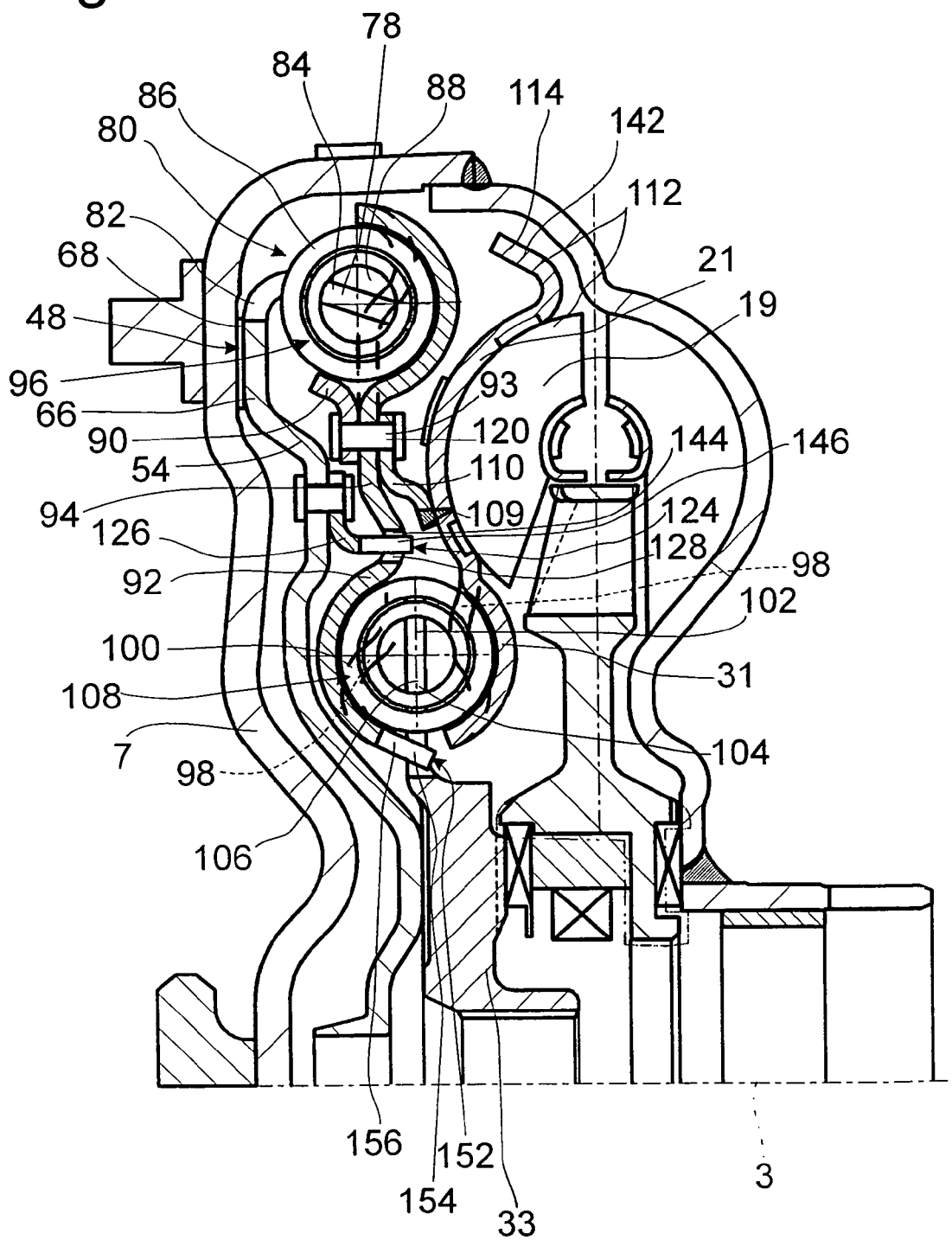
FIG. 4 shows a torsional vibration damper based on the functional principle of FIG. 1 but with a reduced number of components.
Figure 5:
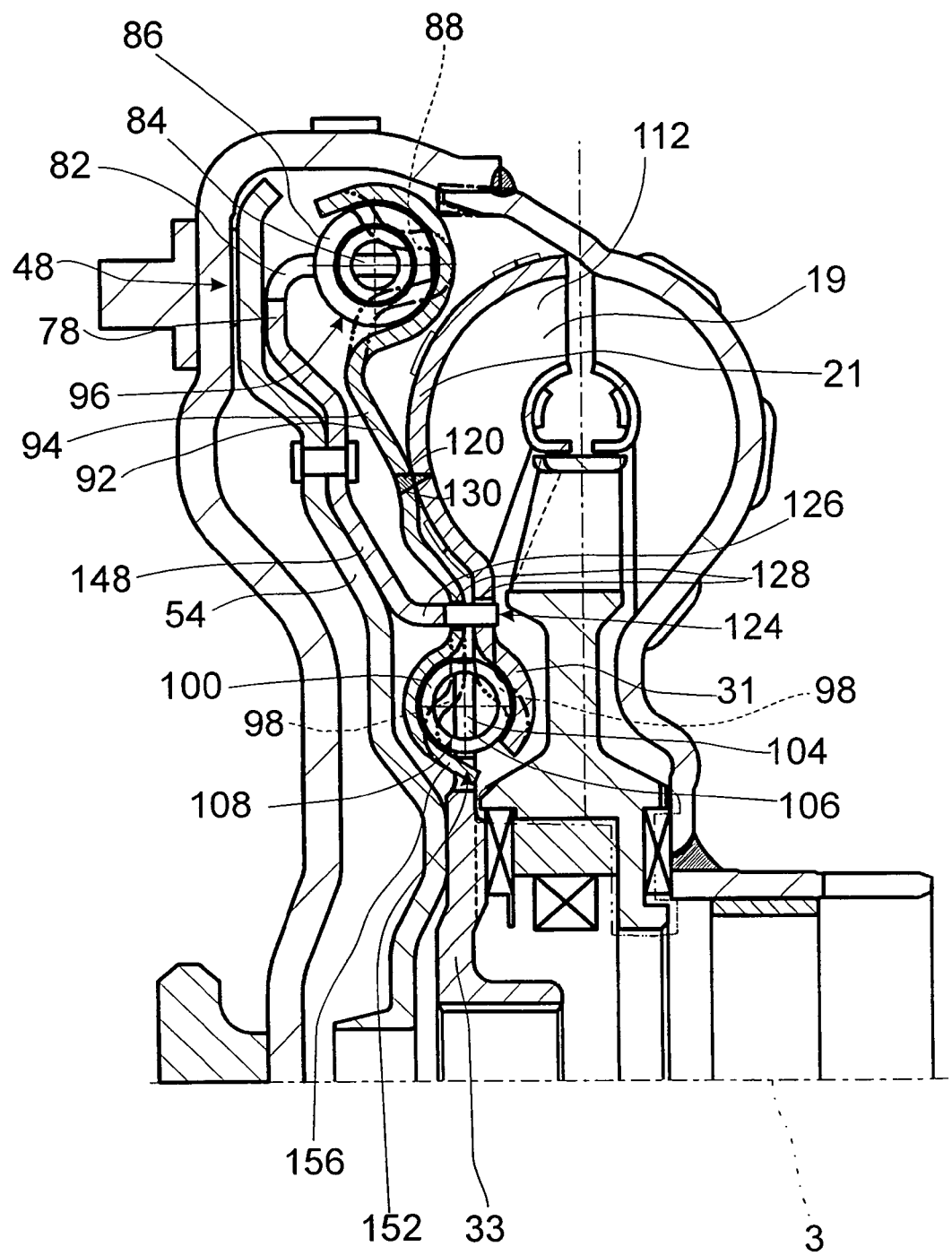
FIG. 5 is similar to FIG. 4 but shows an even further reduction in the number of components.
Figure 6:
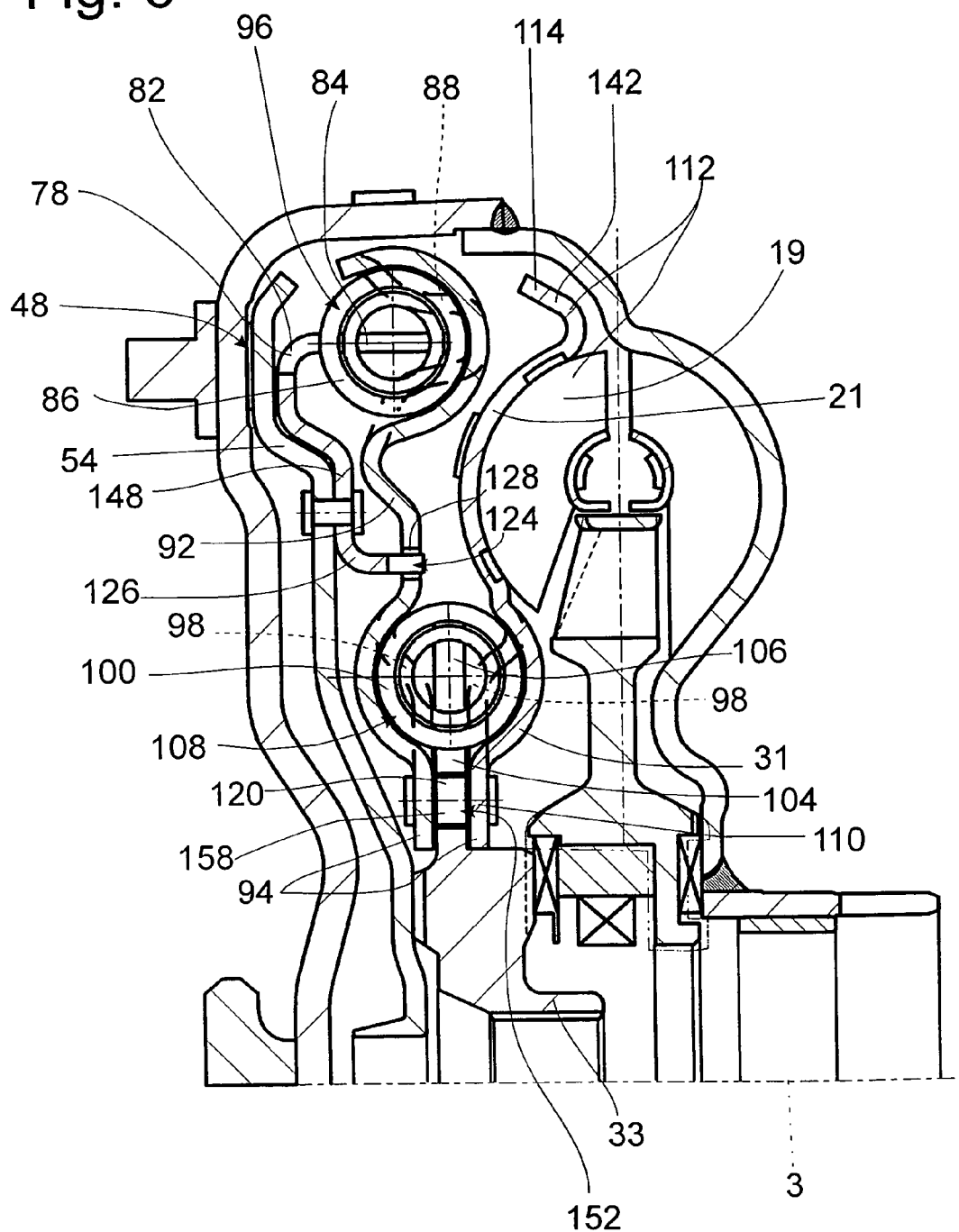
FIG. 6 is similar to FIG. 4 but shows the connection of the turbine wheel to the torsional vibration damper at a point radially farther toward the inside.
Figure 7:
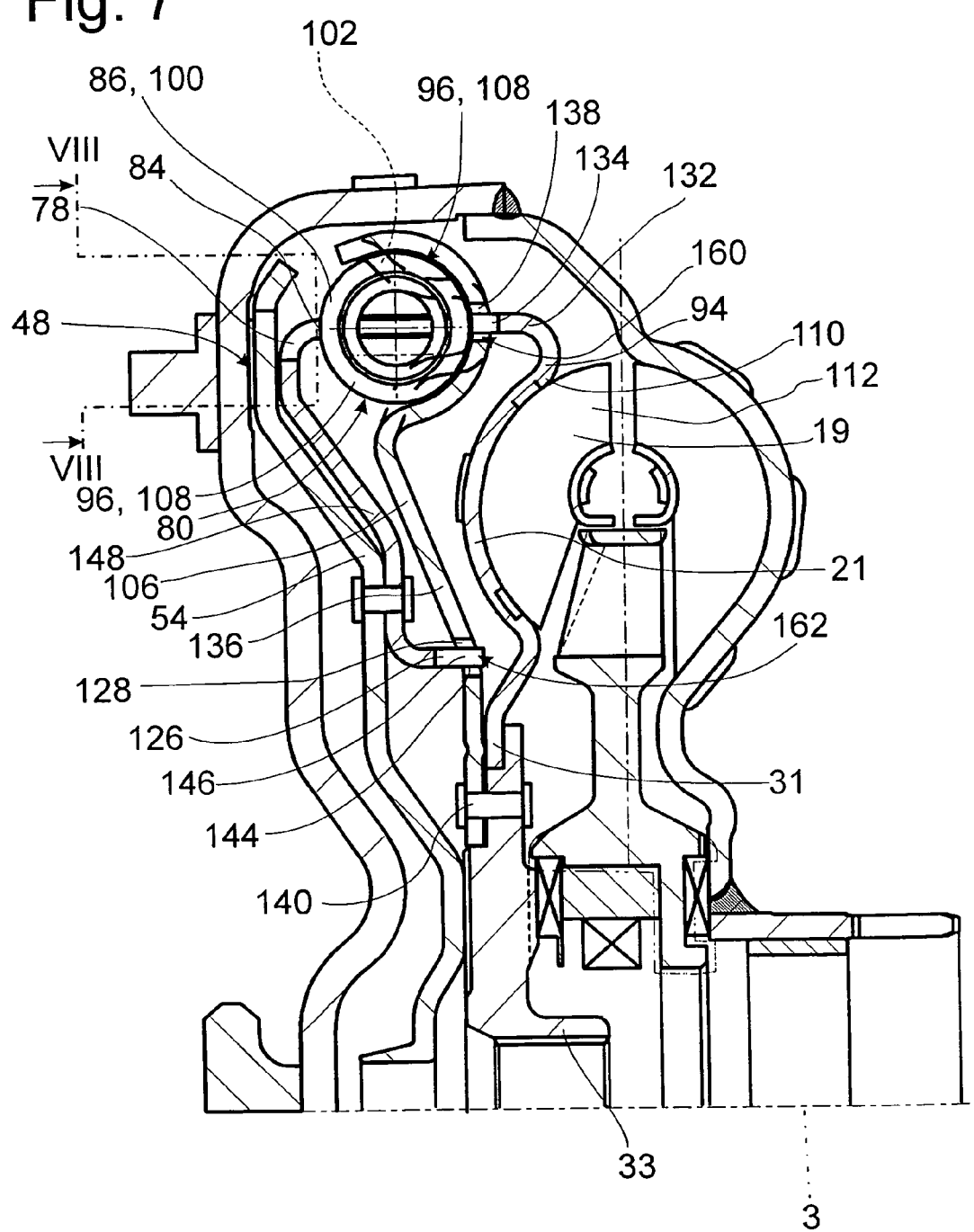
FIG. 7 is similar to FIG. 1 but shows the arrangement of two connecting devices with a circumferential offset from each other instead of a radial offset.

In the case where the piston 54 serves as the friction lining carrier 66, the drive-side transmission element 78 of the torsional vibration damper 80 is either formed as an integral part of the piston as in FIG. 4 or, as in FIGS. 5–7, realized on a driver plate 148, which is nonrotatably attached to the piston 54, and which, a certain radial distance away from the drive-side transmission element 78, has the securing element 126 of another version of the rotational angle limiter 124, which will be described further below. In all these designs, the drive-side transmission element 78 serves as the radially outer hub disk 82, which provides the driver elements 84 for the first energy-storage devices 86 of the drive-side connecting device 96.

In the design according to FIG. 4, the other ends of the energy-storage devices 86 are supported on a cover plate 92, serving as the intermediate transmission element 94, which plate provides a semicircular enclosure around both the first energy-storage devices 86 and the second energy-storage devices 100 of the takeoff side connecting device 108 located radially inside the first energy-storage devices. At the same time, the plate provides driver elements 88 for the first energy-storage devices 86 and driver elements 98 for the second energy-storage devices 100. The ends of the second energy-storage devices 100 facing away from the control elements 98 are supported on the driver elements 102 of the radially inner hub disk 104, which is mounted on the turbine wheel hub 33.

The cover plate 92 is provided with the pins 93 radially just inside the first energy-storage devices 86; these pins not only firmly connect a very compact second cover plate 90 nonrotatably to the cover plate 92 but also serve as an actuation point 120 for a tie element 110, which is attached by the weld 109 to the turbine wheel shell 21 of the turbine wheel 19. As a result, the turbine wheel 19 can act as a mass element 112, especially since the turbine wheel shell 21 has a bent-over section 142, which acts as a supplemental mass 114, in its radially outer area.

The radially inner end of the turbine wheel shell 21 extends toward the turbine wheel hub 33 and provides an enclosure in the form of a segment of a circle around the second energy-storage devices 100. This radially inner section of the turbine wheel shell 21, referred to below simply as the turbine wheel base 31, can be used as a cover plate, which, like the previously mentioned cover plate 92 serving as the intermediate transmission element 94, provides driver elements 98 for the second energy-storage devices 100 and which, as a result of the nonrotatable connection between the turbine wheel shell 21 and the cover plate 92, is connected nonrotatably to the cover plate.

Figure 8:
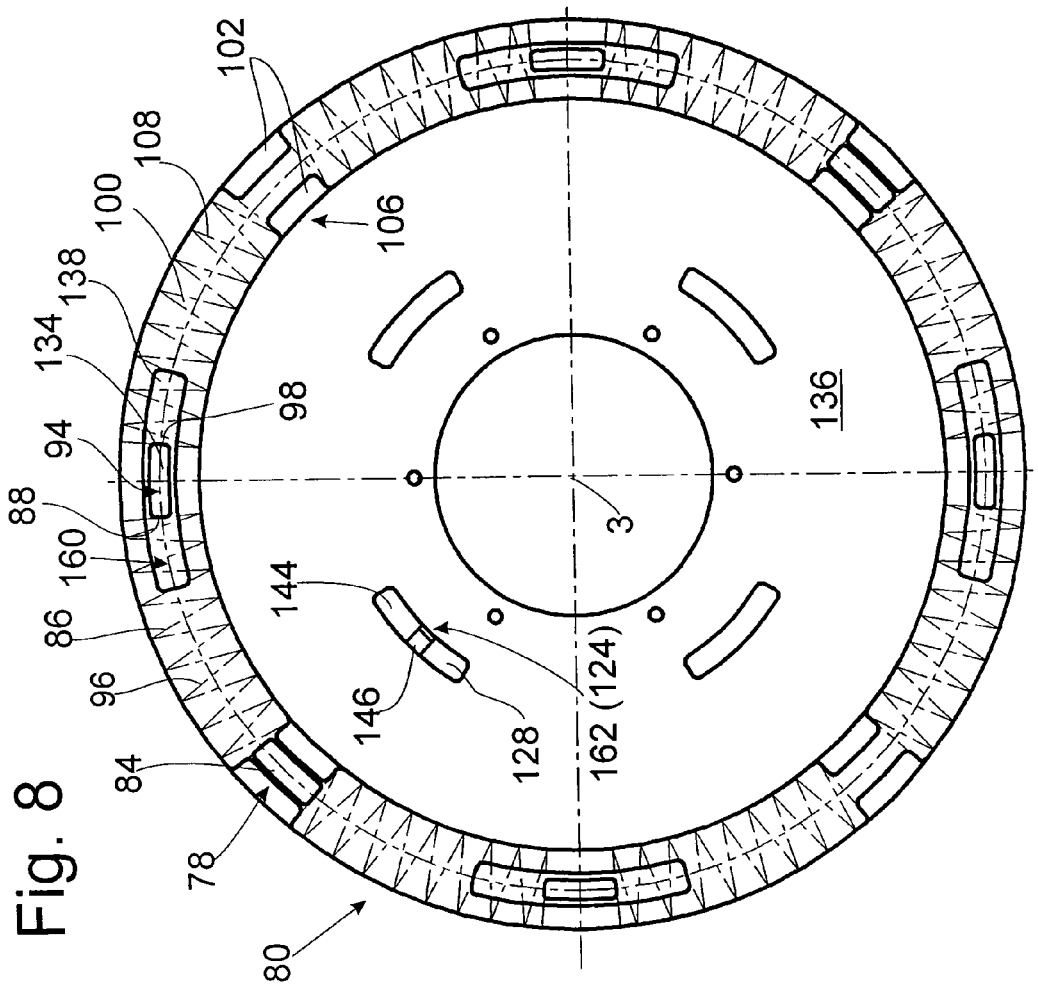
FIG. 8 shows a plan view of the connecting devices from the perspective of the line VIII—VIII in FIG. 7.

A rotational angle limiter 124 is also provided in this design; the limiter has a securing element 126 with an essentially L-shaped cross section attached to the piston 54. The securing element cooperates with an opposing securing element 128 in the cover plate 92. The opposing securing element 128 takes the form of slots 144 extending in the circumferential direction, in which axial projections 146 of the securing element 126 engage. The range of movement in the circumferential direction which is available to these projections specifies the maximum relative rotational deflection between the drive-side transmission element 78 of the torsional vibration damper 80 and its intermediate transmission element 94. By way of example, FIGS. 8 and 10 show the size relationship between the axial projections 146 and the slots 144.

A second rotational angle limiter 152 is provided radially inside the takeoff-side connecting device 108 to determine the maximum rotational deflection of the intermediate transmission element 94 with respect to the takeoff-side transmission element 106. In this rotational angle limiter 152, the circumferentially offset axial projections 154 of a securing element 156 fit between the driver elements 102 of the radially inner hub disk 104 with an appropriate amount of circumferential play.

The design according to FIG. 4 is associated with a reduction in the number of components in comparison with FIG. 1. Because the turbine wheel base 31 and the driver elements 98 are provided on the turbine wheel shell 21, it becomes possible to eliminate, for example, one of the cover plates.

The design according to FIG. 5 differs from that according to FIG. 4 essentially in that the previously discussed driver plate 148 is fastened to the piston 54. The rotational angle limiter 124 provided on the driver plate 148 corresponds essentially to that of FIG. 4, but it passes not only through an opposing securing element 128 in the cover plate 92 acting as the intermediate transmission element 94 but also through an opposing securing element 128 in the turbine wheel shell 21. As a result, this rotational angle limiter 124 is stronger than that shown in FIG. 4. This also applies to the cover plate 92 in FIG. 5 because of the close proximity of the cover plate 92 to the turbine wheel shell 21. The cover plate 92 is attached directly to the turbine wheel shell 21 and thus to the turbine wheel 19 by means of a weld 130. Thus the number of components in FIG. 5 is even smaller than that of the design in FIG. 4, because the separate tie element 110 present there can be eliminated. The second rotational angle limiter 152 corresponds otherwise to that of FIG. 4.

In contrast to the designs according to FIGS. 4 and 5, the turbine wheel shell 21 in FIG. 6 is drawn even further inward in the radial direction, so that it can be connected by means of riveting 158 radially inside the second energy-storage devices 100 of the takeoff-side connecting device 108 to the cover plate 92, which serves as the intermediate transmission element 94. In this design, therefore, the turbine wheel base 31 acts as a tie element 110 between the turbine wheel 19 and the intermediate transmission element 94, and the riveting 158 radially inside the takeoff-side connecting device 108 serves as an actuation point 120. The riveting 158 also serves an additional function; that is, it acts as a second rotational angle limiter 152, which operates in the same way as the rotational limiter 124 in FIG. 1. The radially outer rotational angle limiter 124 in FIG. 6, however, has the same design as that illustrated in FIG. 4.

Figure 9:
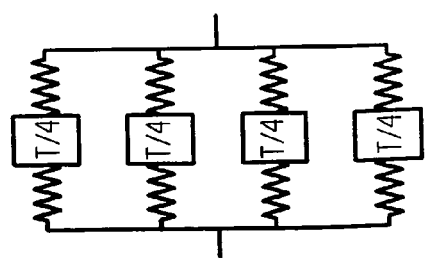
FIG. 9 shows a schematic diagram of how the connecting devices are connected to each other.

FIG. 7 is to be considered in conjunction with FIGS. 8 and 9. In contrast to the designs explained above, the drive-side connecting device 96 with its first energy-storage devices 86 and the takeoff-side connecting device 108 with its second energy-storage devices 100 are provided on essentially the same radius around the axis of rotation 3 of the hydrodynamic clutch arrangement 1. The drive-side transmission element 78 provided on the driver plate 148 exerts force, as FIG. 8 shows more clearly, by its driver element 84 on the adjacent first energy-storage device 86 of the drive-side connecting device 96, the other end of the energy-storage device being supported on the driver element 88 of a driver projection 134, which is formed on a control plate 132, which is designed as an integral part of the turbine wheel shell 21. The driver projections 134 proceed essentially in the axial direction from the essentially ring-shaped control plate 132, and each one passes through an opening 138 in a cover plate 136, which encloses both the first energy-storage devices 86 and the second energy-storage devices 100 over a portion of their circumference. As can be seen in FIG. 8, the opening 138 is larger in the circumferential direction than the associated driver projection 134, so that the latter is able to execute relative movements within the opening 138. The driver projection 134 cooperates with the opening 138 to form a first rotational angle limiter 160, which acts between the drive-side transmission element 78 and the control plate 132, serving as the intermediate transmission element 94.

The driver element 98 of the driver projection 134 is able to exert force on the circumferentially adjacent second energy-storage device 100, the opposite end of which is supported on the driver elements 102 of the previously mentioned cover plate 136, which therefore serves as the takeoff-side transmission element 106. This element is attached by riveting 140 to the turbine wheel hub 33, whereas the turbine wheel base 31 of the turbine wheel shell 21 and thus the shell itself are able to move in the circumferential direction relative to the turbine wheel hub 33. As further explanation it should be remembered that, between the drive-side transmission element 78 and the takeoff-side transmission element 106, there is a second rotational angle limiter 162, which is designed in the same way as the rotational angle limiter 124 in FIG. 4 and which determines the total relative rotational angle of the torsional vibration damper.

In this design as well, therefore, the turbine wheel 19 acts as an intermediate mass 112 between the drive-side connecting device 96 and the takeoff-side connecting device 108, because, whenever the driver projections 134 are deflected, the turbine wheel 19 is carried along by means of the control plate 132 acting via the energy-storage devices 86 and 100. This movement of the driver projections 134 is initiated in each case by a displacement of the drive-side transmission element 78 in the circumferential direction and by the resulting deformation of the first energy-storage devices 86. As soon the displacement of the driver projections 134 begins, the second energy-storage devices 100 are deformed, and thus the takeoff-side transmission element 106 is deflected, which, as a result of its nonrotatable connection to the turbine wheel hub 33, transmits this movement via the hub to a takeoff-side component, as indicated in FIG. 1 by the reference number 116.

When the two connecting devices 96 and 108 are located in the radially outer area of the torsional vibration damper 80, variants with respect to the combination of the first energy-storage devices 86 and the second energy-storage devices 100 are conceivable, as FIG. 10 shows by way of example. In FIG. 8, the energy-storage devices are relatively short in the circumferential direction, and the driver projections 134, which are offset by 90° from each other, engage between a first energy-storage device 86 and a second energy-storage device 100. In the design according to FIG. 10, however, only two driver projections 134 are provided, which engage between the two corresponding energy-storage devices 86, 100. Between them in the circumferential direction there are no other driver elements 134; instead, energy-storage devices which are much longer in the circumferential direction are provided, which, as a function of the desired spring rate, can be realized in a manner comparable to the first energy-storage devices 86 or to the second energy-storage devices 100. The associated spring circuit diagrams in FIGS. 9 and 11 show the previously explained differences in schematic fashion.

Figure 12:
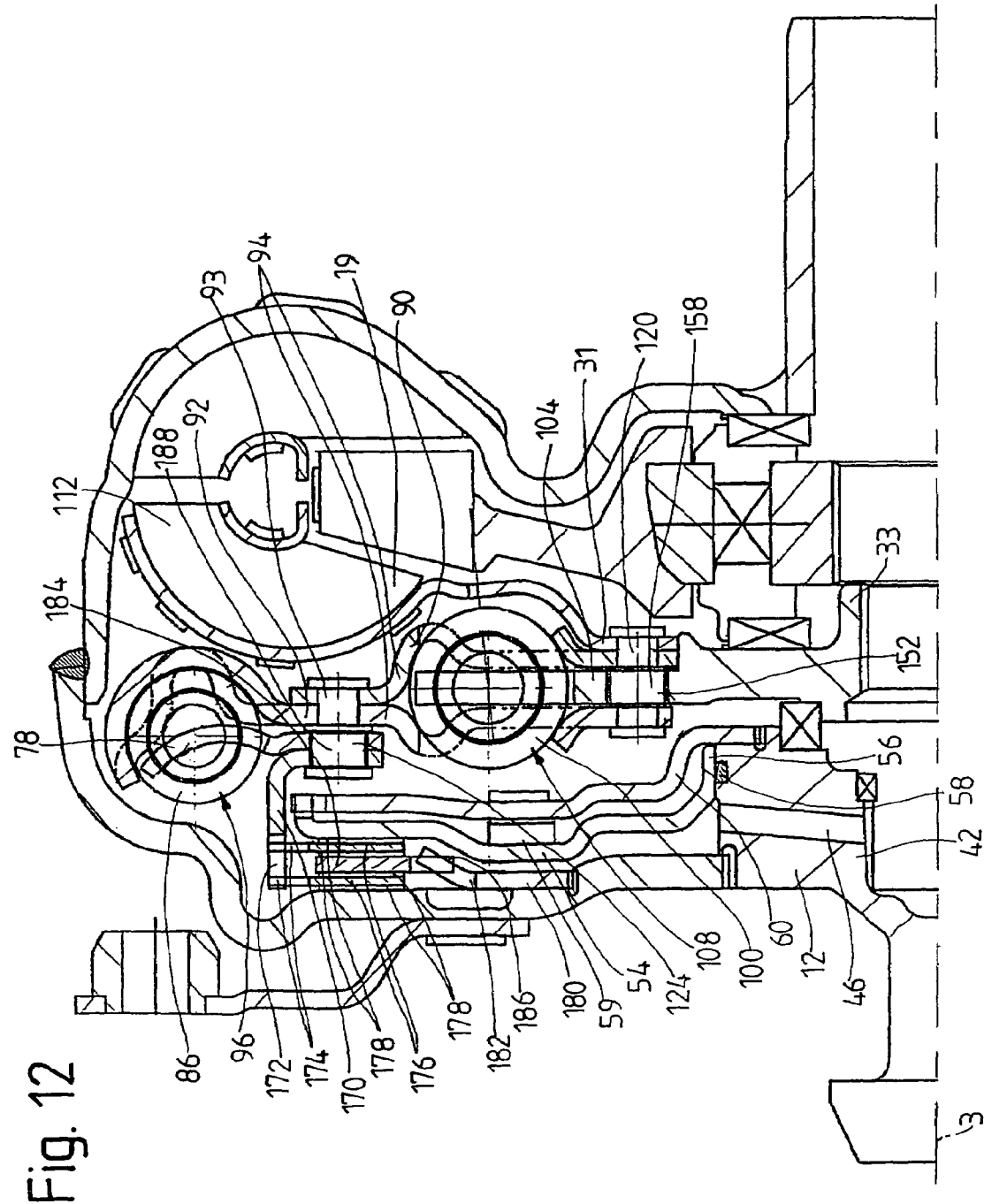
FIG. 12 is similar to FIG. 6 but shows a plurality of friction surfaces on the bridging clutch.

FIG. 12 shows a design of the torsional vibration damper with connecting devices 96, 108, which are located radially one outside the other, where, as also in the case of the previously described FIG. 6, the turbine wheel base 31 of the turbine wheel 19 is attached by riveting 158 to the intermediate transmission element 94. In contrast to FIG. 6, however, the intermediate transmission element 94 is formed not only by the cover plate 92 but also by a second cover plate 90, which is attached by pins 93 to the cover plate 92. As also realized in FIG. 6, the riveting 158 serves another function in cooperation with the radially inner hub disk 104 on the turbine wheel hub 33; that is, it serves as a second rotational angle limiter 152, which supplements the first rotational angle limiter 124. The latter functions with the help of projections, provided on the pins 93 but not visible in FIG. 12, which extend toward the drive-side transmission element 78 and pass through circumferential grooves of limited circumferential dimension in that element.

The essential difference between the design according to FIG. 12 and that according to FIG. 6, however, is to be found in the design of the bridging clutch 48. This has two plates 176 axially between the clutch cover 7 of the clutch housing 5 and the piston 54; these plates have sets of teeth 174 in their radially outer area, by means of which they engage nonrotatably but with freedom of axial movement in a set of teeth 172 of a retaining bracket 170, which is mounted by rivets 188 nonrotatably to the drive-side transmission element 78.

Each of the two plates 176 carries a friction lining 178 on each of its two axial sides. The two friction linings 178 which face each other have an intermediate plate 184 axially between them, the radially inner end of which has a set of teeth 186, by which it engages in a set of teeth 182 on an anti-rotation device 180, which is mounted nonrotatably on the housing cover 7. The sets of teeth 182, 186 thus connect the intermediate plate 184 nonrotatably to the clutch housing, whereas the plates 176, because of the way in which they are connected to the drive-side transmission element 78, are able to move relative to the clutch housing 5.

Regardless of whether the friction linings 178 are, as previously described, attached to the plates 176 and the intermediate plate 184 carries no lining, or whether the intermediate plate 184 is provided with friction linings 178 on both sides and the adjacent plates 176 have no linings on their corresponding axial sides, the design of the bridging clutch 48 according to FIG. 12 means that four friction surfaces are obtained, so that much higher torques can be transmitted than in a design according to FIG. 6, in which only a single friction surface is present.

The piston 54 is mounted in freely rotatable fashion on a journal hub 12, which, as already shown in FIG. 1, provides a flow passage 42 and thus has channels 46. The piston 54 is mounted by way of its piston base 56 on a piston seal 58 and is fastened by way of tangential leaf springs 59 to a mounting device 60, which is mounted nonrotatably on the journal hub 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Torsional vibration damper in a hydrodynamic clutch arrangement having an axis of rotation, a clutch housing, a bridging clutch, a turbine wheel, and a takeoff-side component, the torsional vibration damper comprising:
   a drive-side connecting device comprising a drive-side transmission element which can be connected to the clutch housing;
   a takeoff-side connecting device comprising a take-off side transmission element which can be connected to the takeoff-side component;
   an intermediate transmission element having an actuation point located operatively between said connecting devices;
   first energy storage devices connecting said intermediate transmission element to said drive-side connecting device;
   second energy storage devices connecting said intermediate transmission element to said takeoff-side connecting device; and
   a mass element fixed to said actuation point so that said mass element cannot rotate relative to said intermediate element, said mass element being rotable relative to said drive side transmission element and relative to said take-off side transmission element.

2. Torsional vibration damper according to claim 1, wherein the mass element comprises the turbine wheel, the turbine wheel being rotatable relative to the take-off side transmission element.

3. Torsional vibration damper according to claim 2 wherein the mass element comprises a supplemental mass in addition to the turbine wheel.

4. Torsional vibration damper according to claim 3, wherein the supplemental mass is provided on the turbine wheel.

5. Torsional vibration damper according to claim 3, wherein the turbine wheel has a radially outer area to which the supplemental mass is fixed.

6. Torsional vibration damper according to claim 2, further comprising a tie element connecting the intermediate transmission element to the turbine wheel, said tie element spacing the mass element from the actuation point.

7. Torsional vibration damper according to claim 1, wherein the first energy-storage devices are radially offset from the second energy-storage devices with respect to the axis of rotation, the intermediate transmission element comprising a first cover plate having radially offset driver elements for the energy-storage devices.

8. Torsional vibration damper according to claim 7, further comprising a second cover plate attached nonrotatably to the first cover plate, said second cover plate having radially offset driver elements for the energy-storage devices, said drive-side transmission element and said take-off-side transmission element being received axially between said first and second cover plates.

9. Torsional vibration damper according to claim 1, wherein the first energy-storage devices and the second energy-storage devices are essentially the same radial distance away from the axis of rotation but are circumferentially offset from each other, the intermediate transmission element comprising a control plate having drive projections which engage circumferentially between the first energy-storage devices and the second energy-storage devices, the mass element being attached to the control plate.

10. Torsional vibration damper according to claim 9, wherein the turbine wheel comprises a turbine wheel shell, the control plate being formed on the turbine wheel shell.

11. Torsional vibration damper according to claim 9, wherein the takeoff-side transmission element comprises a cover plate having openings, each said drive projection passing through a respective said opening to bridge the gap between the energy-storage devices and the turbine wheel with freedom of relative movement in the circumferential direction.

12. Torsional vibration damper according to claim 1, wherein the drive-side transmission element is connected for rotation in common to a component of the bridging clutch.

13. Torsional vibration damper according to claim 1, wherein the drive-side transmission element is formed as an integral part of a piston of the bridging clutch.

14. Torsional vibration damper according to claim 1, further comprising a rotational angle limiter which limits the amount by which the drive-side transmission element can rotate with respect to the intermediate transmission element.

15. Torsional vibration damper according to claim 14, further comprising a tie element connecting the intermediate transmission element to the turbine wheel, the rotational angle limiter comprising a pin attaching the tie element to the intermediate transmission element.

16. Torsional vibration damper according to claim 14, wherein the rotational angle limiter comprises a securing element attached nonrotatably to the drive-side transmission element and an opposing securing element on the intermediate transmission element, said opposing securing element cooperating with the first securing element with freedom of relative rotation in the circumferential direction.

17. Torsional vibration damper according to claim 16, wherein both the securing element and the drive-side transmission element are provided on a driver plate connected nonrotatably to the piston of the bridging clutch.

18. Torsional vibration damper according to claim 8 further comprising a driver element by which the second cover plate acts on the energy-storage device of the takeoff-side connecting device, the second cover plate with the driver element being provided on the radially inner end of the turbine wheel shell.

19. Torsional vibration damper according to claim 1 wherein the turbine wheel comprises a turbine wheel shell, the turbine wheel being centered on the second energy-storage devices by the radially inner end of the turbine wheel shell.

20. Torsional vibration damper according to claim 1, wherein the turbine wheel is attached directly to the intermediate transmission element at the actuation point.

21. Torsional vibration damper according to claim 20, wherein the turbine wheel is welded to the actuation point.

22. Torsional vibration damper according to claim 21, wherein the turbine wheel can rotate freely relative to a turbine wheel hub.

23. Torsional vibration damper according to claim 22, wherein the turbine wheel comprises a base mounted on the turbine wheel hub.

24. Torsional vibration damper according to claim 1, further comprising a turbine wheel hub connected for rotation in common to the takeoff-side component of the hydrodynamic clutch arrangement, the takeoff-side transmission element being connected nonrotatably to a turbine wheel hub.

25. Torsional vibration damper according to claim 1, wherein the mass element comprises a supplemental mass, which is independent of the turbine wheel.

26. Torsional vibration damper according to claim 25, further comprising a tie element which attaches the supplemental mass to the intermediate transmission element, said tie element extending in the radial direction.

27. Torsional vibration damper according to claim 26, wherein the tie element is a carrier for the supplemental mass and holds this mass into a radially outer area of the turbine wheel.

28. Torsional vibration damper according to claim 27, wherein the carrier for the supplemental mass has elasticity in the axial direction.

29. Torsional vibration damper according to claim 1, wherein the turbine wheel comprises a turbine wheel shell having a bent radially outer edge which acts as a supplemental mass.

30. Torsional vibration damper according to claim 1 further comprising a first rotational angle limiter provided operatively between the drive-side transmission element and the intermediate transmission element, and a second rotational angle limiter provided operatively between the intermediate transmission element and the takeoff-side transmission element, the second rotational angle limiter being operatively independent of the first rotational angle limiter.

31. Torsional vibration damper according to claim 1, further comprising a first rotational angle limiter provided operatively between the drive-side transmission element and the intermediate transmission element, and a second rotational angle limiter provided operatively between the drive-side transmission element and the takeoff-side transmission element, where the second rotational angle limiter defines the total relative angle of rotation.

32. Torsional vibration damper according to claim 1, further comprising a retaining bracket attached nonrotatably to at least one plate located axially between a piston of the bridging clutch and a housing cover of the clutch housing.

33. Torsional vibration damper according to claim 32, wherein the retaining bracket has teeth which engage the at least one plate so that the plate cannot rotate but can shift in the axial direction.

34. Torsional vibration damper according to claim 32, wherein the plate has at least one axial side provided with a friction lining.

35. Torsional vibration damper according to claim 32, wherein the retaining bracket has teeth connected to the teeth of at least two plates so that the plates cannot rotate relative to the bracket but can shift in the axial direction; said vibration damper further comprising an intermediate plate provided axially between each pair of plates, the intermediate plate having teeth which engage nonrotatably in a corresponding set of teeth on an anti-rotation device.

36. Torsional vibration damper according to claim 35, wherein the anti-rotation device is attached nonrotatably to a housing cover of the clutch housing.

* * * * *